Feb. 4, 1969   A. L. FREEDLANDER ET AL   3,425,199

MOWER BLADE

Filed Feb. 19, 1968

INVENTORS
ABRAHAM L. FREEDLANDER
ROBERT E. MATTHEWS
WAYNE C. GARRETT

BY

Reuben Wolf

ATTORNEY though the invention represents an improved form

United States Patent Office 3,425,199
Patented Feb. 4, 1969

3,425,199
MOWER BLADE
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Feb. 19, 1968, Ser. No. 706,359
U.S. Cl. 56—295    5 Claims
Int. Cl. A01d 55/18

ABSTRACT OF THE DISCLOSURE

A flexible mower blade primarily formed of an elastomeric material such as urethane and having a rigid metal or plastic central mounting portion bonded within the blade for mounting to the lawn mower shaft. Humps on the upper or lower surface opposite the ends of the portion provide reinforcement.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., causes the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In our copending application Ser. No. 625,802 we have described a blade made primarily of a urethane elastomer, but having a rigid central mounting plate embedded within the elastomer for mounting the blade upon the drive shaft. The present invention represents an improved form of blade in which the elastomer has a hump in the form of an arc opposite the ends of the plate for the purpose of improving the salutory effect of the plate in the blade. As indicated in the above-mentioned application, the central plate provides an improved mounting member which eliminates separate members that would otherwise be required. But in addition, the rigid central plate tends to reduce the elongation of the elastomeric material, controls the twisting torque of the cutting area, and also affects the up and down deflection of the tips. The hump cooperates with the blade by reinforcing the elastomeric material and minimizing any tendency for the blade to crack opposite the ends of the plate. The hump also provides a little extra stiffness to the blade without seriously affecting the flexibility needed to provide safety in the cutting area. For optimum results, the center line of each hump should be slightly outward (toward the tip) of the end of the plate.

The specific embodiments of the invention are described in the following specification and claims, and illustrated in the drawings, in which:

Figure 1:
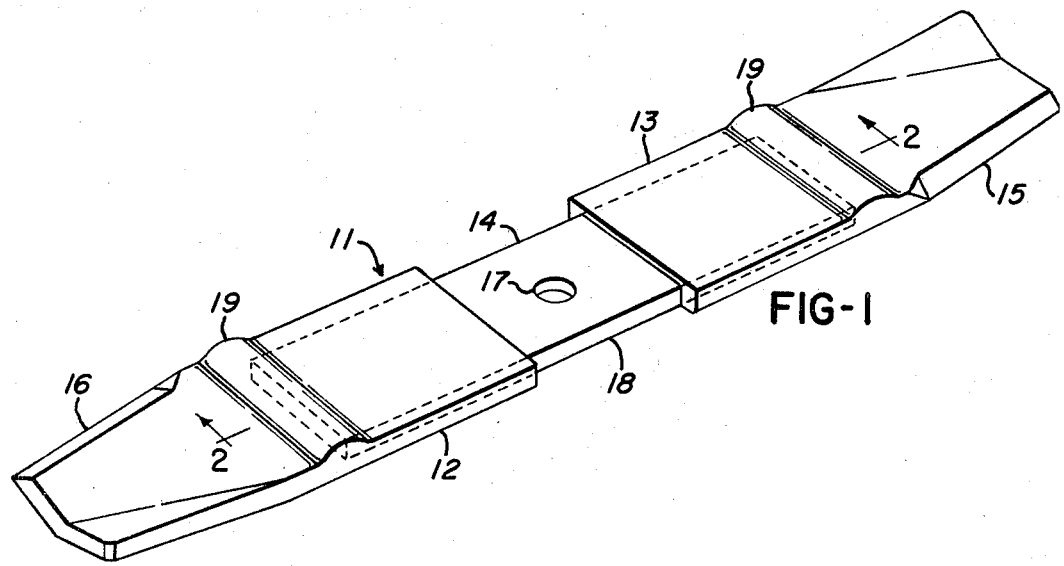
FIGURE 1 is a perspective view of a novel blade.
Figure 2:
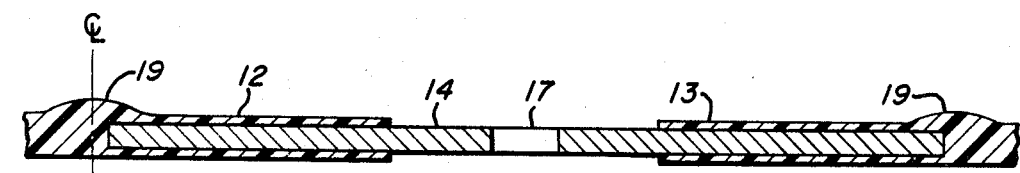
FIGURE 2 is a cross-sectional view of the blade taken along line 2—2 of FIGURE 1.
Figure 3:
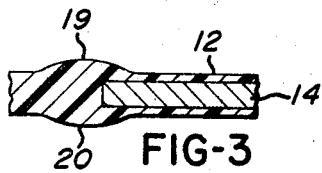
FIGURES 3 and 4 are partial views similar to FIGURE 2 illustrating a broken portion of a modified form of the blade.

Referring to the drawings, FIGURE 1 illustrates a lawn mower blade 11 which is generally flat and rectangular and has outwardly extending arms 12 and 13 having cutting edges 15 and 16 at their extremities. These arms are made of an elastomer, and preferably of a urethane elastomer such as more fully described in our copending application referred to above, of the type which may be molded or cast and formulated from a polyester or polyether based isocyanate terminated prepolymer. Mounted within the central portion of the blade is a rigid central mounting plate 14 which may be made of a metal or of a rigid plastic material such as nylon, polycarbonate, polystyrene, polyacetal, or the like. As shown in FIGURES 1–3 this plate 14 is at least partially embedded within the arms and forms a central mounting member, the central section 18 of the plate being exposed. An aperture 17 in the center of the plate permits mounting on the shaft of a lawn mower and the use of the appropriate hardware for mounting. The aperture 17 may be made with a diameter which is required to fit the smallest of the lawn mowers on the market, so that it is only necessary for the user to drill this hole out to a larger diameter if required for his particular mower. The plate which is illustrated provides a solid mounting member on the blade and at the same time provides stiffness in the central portion of the blade and minimizes longitudinal stretch as referred to above. Opposite the ends of the plate 14, as illustrated in FIGURES 1 and 2, are reinforcing humps 19 on the upper surfaces of the blade. These humps have the shape of an arc, and it has been found that the best results are obtained when the ends of the plate terminate about one quarter inch inward of the center line of this arc. The plate should not extend outward of this center line, or there will not be sufficient flexibility in the cutting area. On the other hand, the plate should not terminate too far inward of the hump or there will not be sufficient stiffness. The novel combination of the hump and plate has been found to improve the blade to an unexpected degree by combining stiffness in the center with flexibility in the cutting area.

FIGURE 3 represents a modified form of the invention in which there is a hump 20 on the lower surface of the blade in addition to hump 19 on the upper surface.

Figure 4:
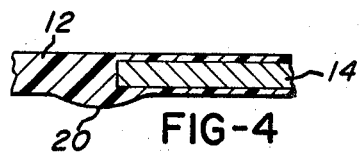

FIGURE 4 represents another form of the invention in which the hump 19 is omitted, but the hump 20 is utilized on the lower surface of the blade for the same purpose.

The inventive concept is carried out regardless of which of the above configurations is utilized.

It should be understood that the principle of using an embedded central web is not limited to the blade as illustrated, but may also be used with blades having three, four, or more arms, and may also be used with blades having modified shapes instead of being flat. Whichever form of the invention is utilized the main principle to be followed is that of providing a rigid central mounting portion within the flexible body.

It should also be understood that the web may be of sufficient thickness, density, or configuration to provide the necessary weight required for proper flywheel effect in the blade. This could also be done by driving rivets through the blade and web, if desired. The web may also have other configurations than those illustrated; for example, the edges may be scalloped or otherwise irregular, rather than being straight as shown.

Other modifications are specifically contemplated as being within the scope of this invention.

We claim:

1. In a lawn mower having a rotatable shaft and a cutting blade mounted thereon, said blade including outwardly extending arms having integral cutting edges of a flexible elastomer, and a rigid central mounting plate extending outwardly into said arms and terminating inwardly of said cutting edges, said arms having thicker sections in the areas where said plate terminates.

2. The blade of claim 1 in which the surfaces of each of said thicker sections are in the shape of an arc, said plate terminating inwardly of the center line of said arc.

3. The blade of claim 1 in which said elastomer is polyurethane.

4. The blade of claim 1 in which said plate is metal.

5. The blade of claim 1 in which said plate is a rigid plastic material.

References Cited

UNITED STATES PATENTS

| 2,473,665 | 6/1949 | Van Nort | 170—159 |
| 3,302,377 | 2/1967 | Ely | 56—295 |
| 3,320,732 | 5/1967 | Kirk | 56—295 |
| 3,340,682 | 9/1967 | Ely | 56—295 |

ABRAHAM G. STONE, *Primary Examiner.*

P. A. RAZZANO, *Assistant Examiner.*

U.S. Cl. X.R.

30—347